United States Patent
Zhong et al.

(10) Patent No.: US 8,682,354 B2
(45) Date of Patent: Mar. 25, 2014

(54) METHOD AND APPARATUS FOR POSITIONING MOBILE TERMINAL'S LOCATION

(75) Inventors: Chuan Zhong, Beijing (CN); Lei Zhou, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 13/131,095

(22) PCT Filed: Nov. 25, 2009

(86) PCT No.: PCT/KR2009/006982
§ 371 (c)(1),
(2), (4) Date: May 25, 2011

(87) PCT Pub. No.: WO2010/062108
PCT Pub. Date: Jun. 3, 2010

(65) Prior Publication Data
US 2011/0223940 A1 Sep. 15, 2011

(30) Foreign Application Priority Data

Nov. 26, 2008 (CN) .......................... 2008 1 0177976

(51) Int. Cl.
*H04W 24/00* (2009.01)

(52) U.S. Cl.
USPC .................. 455/456.5; 455/456.6; 455/456.1; 455/456.2; 455/450; 370/252; 370/350

(58) Field of Classification Search
USPC .......... 455/456.5, 456.6, 456.1, 456.2, 422.1, 455/441, 450, 503; 370/252, 350
See application file for complete search history.

(56) References Cited

U.S. PATENT DOCUMENTS

| | | |
|---|---|---|
| 6,473,619 B1 * | 10/2002 | Kong et al. ................ 455/456.1 |
| 6,728,545 B1 | 4/2004 | Belcea |
| 6,973,316 B1 | 12/2005 | Hayakawa |
| 2006/0267841 A1 | 11/2006 | Lee et al. |
| 2007/0100539 A1 | 5/2007 | Jang et al. |
| 2007/0115842 A1 * | 5/2007 | Matsuda et al. ............. 370/252 |
| 2008/0280625 A1 * | 11/2008 | Larsen ....................... 455/456.1 |

* cited by examiner

*Primary Examiner* — Khai M Nguyen
(74) *Attorney, Agent, or Firm* — Jefferson IP Law, LLP

(57) ABSTRACT

A method by a Mobile Terminal (MT) for positioning the MT is provided. The method includes requesting a Base Station (BS) to allocate a first transmission time for transmitting a first sounding signal for the MT, receiving the first transmission time from the BS, transmitting the first sounding signal to the BS at the first transmission time, requesting the BS to allocate a second transmission time of a second sounding signal for the MT after the MT moves, receiving the second transmission time from the BS, transmitting the second sounding signal to the BS at the second transmission time, reporting a moving distance moved during the period between the first transmission time and the second transmission time, and receiving a position of the MT determined based on the first sounding signal, the second sounding signal, and the moving distance.

20 Claims, 4 Drawing Sheets

US 8,682,354 B2

METHOD AND APPARATUS FOR POSITIONING MOBILE TERMINAL'S LOCATION

PRIORITY

This application is a National Stage application under 35 U.S.C. §371 of an International application filed on Nov. 25, 2009 and assigned application No. PCT/KR2009/006982, and claims the benefit under 35 U.S.C. §365(b) of a Chinese patent application filed on Nov. 26, 2008 in the Chinese Intellectual Property Office and assigned application No. 200810177976.0, the entire disclosures of which is hereby incorporated by reference.

BACKGROUND OF THE INVENTION

1. Field of the Invention

The present invention relates to a method and an apparatus for positioning a mobile terminal's location.

2. Description of Related Art

Wireless positioning services are referred to as Location-Based Services (LBS). A mobile communication network retrieves information on the location of a mobile communication gateway by a series of positioning techniques, and provides the information to a subscriber or others and the communication system, and thus implements a value-added service related to the location.

Generally speaking, all location-based services belong to LBS. Some services may have nothing to do with the location of the subscriber, such as weather at a fixed location or traffic routes between fixed start and end locations. However, in a mobile communication network, most LBS-relevant services have a close relationship with the location of the subscriber who holds the mobile terminal.

Before the implementation of mobile LBS, Global Positioning System (GPS) was applied in navigation and positioning services. With the development of mobile communication network technology, mobile LBS has been gradually applied and has matured since 1999. Presently, the mobile LBS realized via the mobile communication network is not only widely applied in special fields such as logistics management, traffic scheduling, medical rescue, field exploration and so on, but is also equally relevant for daily use.

At present, intense competition exists in the telecommunication industry. Mobile service operators are constantly striving to find new approaches to create new profit points or profit increase points. Mobile LBS is one of the services that bear the greatest potential market. In addition, with the continuous increase in the market of private cars, on-vehicle mobile communication platforms have great development potential. LBS for vehicle navigation and tracking represents a market with great development potential.

Practical applications of LBS include, but are not limited to, the following aspects:

1. Security application, e.g., emergency service and roadside help seeking, etc. If a subscriber becomes in danger at an unacquainted site, the subscriber can call the number of a rescue center (e.g., 110 in China, 911 in the U.S., 411 in Japan) as long as the user mobile phone supports LBS. The mobile communication network will automatically send information on the subscriber's location together with the user's voice information to the rescue center. Upon receiving the subscriber's call, the rescue center carries out rescue action rapidly and efficiently according to the obtained location information. In this way, the probability of successful rescue is drastically improved.

2. Information service application, e.g., daily life information and traffic information, etc. LBS can provide subscribers with map coordinates-related information services and interactive map information services. LBS can also provide subscribers with traffic conditions and optimal routes for car driving. LBS can help subscribers to locate nearby restaurants, cinemas, and other establishments around specified location. LBS can further provide value-added services like ticket booking and seat reservation. LBS can also be used in mobile yellow pages and mobile advertisements.

3. Tracking application, e.g., tracking vehicles or properties, etc. In a big city with high population density, traffic jams are serious issues, and growing requirements are put on vehicle navigation and intelligent transportation. As a core of an Intelligent Transportation System (ITS), an automatic vehicle positioning system provides functions such as dynamic traffic stream allocation, location navigation, emergent handling of accidents, safety precaution, vehicle tracking, vehicle scheduling and so on.

Early development of LBS dates back to the year of 1996. At that time, the Federal Communications Commission (FCC) publicized location requirements, which are referred to as E-911, and required that before Oct. 1, 2001, network operators should provide a positioning service with a precision of less than 1.25 feet to subscribers of mobile devices sending out E911 emergency calls. The network operators were required to provide the caller's location and phone number to be called back together with public emergency services. Later, similar requirements were introduced in Europe and Japan, which eventually brought up the appearance of LBS—calling equipment-based geography location service. After that, rapid development of fields of Positioning Systems, Communication, and Global Information System (GIS) stimulated the industry's imagination on LBS. The service was initially widely adopted by telecom companies to provide customized services to mobile subscribers according to their geographic locations.

LBS is an important subject in most existing mainstream standards at present. Positioning technique is an aspect of LBS, and includes:

a) Network-Based Positioning Technique:

A Mobile Terminal (MT), while receiving a signal from a current serving Base Station (BS), searches for signals from other BSs. If the MT finds that a signal from another BS is stronger than a predetermined threshold, MT determines the difference of the arrival time of the signals from the BSs, so as to prepare for the combination of the two signals. Such a capability of the MT lays a technical foundation for positioning. The positioning operation platform can obtain the MT's information (e.g., information on pilot strength) through a Code Division Multiple Access (CDMA) network and thereby determine a position of the MT. Some other network-based techniques can offer better positioning precision, such as measurement of the MT's round trip delay and Angle Of Arrival (AOA) of a signal. These techniques, however, require the addition of measurement equipment on the BS, and thus increases the cost.

b) Assisted GPS Technique (AGPS):

The assisted GPS technique implements positioning operation primarily depending on GPS satellites. A MT receives signals from at least 4 GPS satellites, performs positioning calculation based on the signals, and reports the calculation result to the network. For a general GPS technique, the GPS receiver searches for available GPS satellites in a global space domain. Such a satellite search requires such a long time that this technique cannot meet the demand of rapid mobile positioning. In the assisted GPS technique, the network can determine the GPS satellites over a cell where the MT is located according to the location of the cell and provide the information to the MT. Based on the information received, the MT can narrow down the scope of search area to implement the search process more quickly. After the search process, the MT transmits the information for calculating the MT's location to the network by interacting with the network. The network uses this information to calculate the MT's location.

c) Hybrid Positioning Technique:

The hybrid positioning technique applied in a CDMA system primarily adopts the two kinds of MT-based positioning techniques mentioned above, Network-based positioning technique and AGPS. Generally, the GPS technique can offer high positioning precision. However, in many scenarios, a MT cannot capture enough GPS satellites. In this case, signals from BSs can be used by the MT to supplement the signals from satellites. In this way, practicability of such positioning is improved and indoor positioning can be realized at the expense of certain accuracy degradation.

d) MT-Based GPS Technique:

For some LBS services requiring quick and continuous positioning (e.g., real time dynamic vehicle navigation), it is necessary to refresh information on the MT location at the interval of several seconds. In this case, the AGPS technique cannot meet the time requirement. In order to reduce the time interval between two consecutive positioning processes, an MT-based GPS technique is introduced. Unlike AGPS, in the MT-based GPS technique the calculation of the location is entirely performed by the MT itself. Further, the MT is always in a GPS tracking state so that time for interacting with the network can be reduced. Unfortunately, Time To First Fix (TTFF) is substantially the same as that with AGPS. It is also necessary to obtain information on GPS satellites from the network side.

e) Dead Reckoning (DR):

With reference to a known relative reference point or start point, the direction and distance of a target object are calculated continuously during its movement. With the help of a map matching algorithm, the location of the moving target can be determined. This approach is suitable for continuous positioning of a moving object. DR depends on measurement precision on the MT's acceleration, velocity, and moving direction. Corresponding measurement information can be provided by means of an odometer, gyroscope, accelerometer, etc.

f) Approaching-Type Positioning:

The location of a moving object is determined by estimation based on the nearest fixed reference detection point. The cell ID-based approach can be regarded as one branch of the approaching-type positioning technique. Estimation of the MT can be obtained with the nearest BS or sector.

The existing techniques have their own advantages and disadvantages. In the case of a single cell, including the case that signals from other cells are overlaid in the cell, positioning approaches based on multi-cell signal detection cannot work. The cell ID-based positioning approach has poor precision, and the GPS-based solution has relatively higher cost.

SUMMARY OF THE INVENTION

Aspects of the present invention are to address at least the above-mentioned problems and/or disadvantages and to provide at least the advantages described below. Accordingly, an aspect of the present invention is to provide a positioning method using Angle Of Arrival (AOA) and terminal moving track in a single cell environment.

In accordance with an aspect of the present invention, a method by a Mobile Terminal (MT) for positioning the MT is provided. The method includes requesting a Base Station (BS) to allocate a first transmission time for transmitting a first sounding signal for the MT, receiving the first transmission time from the BS, transmitting the first sounding signal to the BS at the first transmission time, requesting the BS to allocate a second transmission time of a second sounding signal for the MT after the MT moves, receiving the second transmission time from the BS, transmitting the second sounding signal to the BS at the second transmission time, reporting a moving distance moved during the period between the first transmission time and the second transmission time, and receiving a position of the MT determined based the first sounding signal, the second sounding signal, and the moving distance.

In accordance with an aspect of the present invention, a method by a BS for positioning a mobile terminal (MT) is provided. The method includes transmitting a first transmission time of a first sounding signal for the MT to the MT, receiving the first sounding signal transmitted from the MT at the first transmission time, recording a first arrival time of the first sounding signal and an AOA of the first sounding signal, transmitting a second transmission time of a second sounding signal for the MT to the MT, receiving the second sounding signal transmitted from the MT at the second transmission time, recording a second arrival time of the second sounding signal and an AOA of the second sounding signal, receiving from the MT a moving distance moved by the MT during the period between the first transmission time and the second transmission time, and positioning the MT by using the first arrival time, the AOA of the first sounding signal, the second arrival time, the AOA of the second sounding signal, and the moving distance.

In accordance with an aspect of the present invention, an MT for positioning in a communication system is provided. The MT includes a transmitter for transmitting a request to allocate a first transmission time, for transmitting a first sounding signal for the MT to a BS, for transmitting the first sounding signal at the first transmission time to the BS, for transmitting a request to allocate a second transmission time of a second sounding signal for the MT to the BS again after the MT moves, for transmitting the second sounding signal at the second transmission time to the BS, and for reporting a moving distance moved during the period between the first transmission time and the second transmission time, and a receiver for receiving the first transmission time and the second transmission time from the BS, and for receiving a positioning result of the MT determined based on the first sounding signal, the second sounding signal, and the moving distance.

In accordance with an aspect of the present invention, a BS for positioning an MT in a communication system is provided. The BS includes an allocator for allocating a first transmission time of a first sounding signal for the MT and a second transmission time of a second sounding signal for the MT, a transmitter for transmitting the first transmission time and the second transmission time to the MT, a receiver for receiving the first sounding signal transmitted from the MT at the first transmission time and the second sounding signal transmitted from the MT at the second transmission time, and for receiving from the MT a moving distance moved by the MT during the period between the first transmission time and the second transmission time, a recorder for recording a first arrival time of the first sounding signal, an AOA of the first sounding signal, a second arrival time of the second sounding signal, and an AOA of the second sounding signal, and a controller for positioning the MT based on the first arrival time, the AOA of the first sounding signal, the second arrival time, the AOA of the second sounding signal, and the moving distance.

Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention may be implemented by the cooperation of a Base Station (BS) capable of obtaining an Angle Of Arrival (AOA) of a sounding signal and a Mobile Terminal (MT). Thanks to association with an object's moving track, exemplary embodiments of the present invention are suitable for on-vehicle applications, in which data can be obtained by distance-measuring instruments such as an odometer, as shown in FIG. 1.

Figure 1:
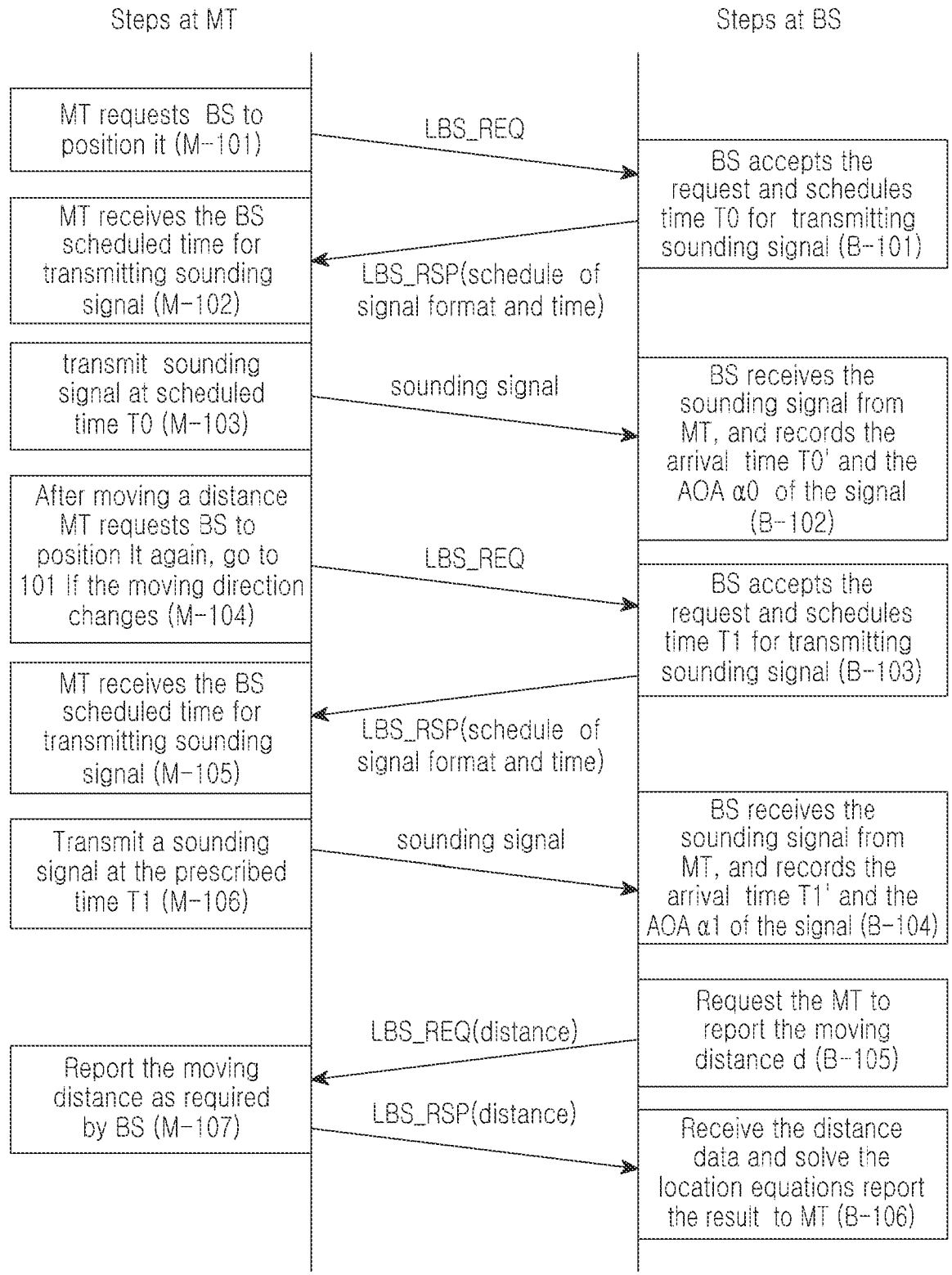
FIG. 1 is a flowchart showing a method of positioning a Mobile Terminal (MT) according to an exemplary embodiment of the present invention.

FIG. 1 is a flowchart showing a method of positioning an MT according to an exemplary embodiment of the present invention.

Referring to FIG. 1, in step M101, the MT initiates an initial positioning request, i.e. the MT transmits LBS_REQ (request) to the BS. In step B101, the BS indicates, via a signaling, a transmission time T0 at which a sounding signal is to be transmitted by the MT. In step M102, the MT receives the signaling, i.e., LBS_RSP (response). In step M103, the MT transmits a sounding signal at the indicated time T0.

In step B102, the BS receives the sounding signal and records the arrival time T0' and the AOA $\alpha_O$ of the sounding signal. In step M104, the MT records its moving track, and transmits LBS_REQ to the BS again after a period of movement. The BS should not be located in a line passing through the two end points of the moving track. On such premise, the length can be arbitrarily chosen as long as the BS and the two end points of the moving track can form a triangle. In step B103, the BS indicates, via a signaling i.e., LBS_RSP, a transmission time T1 at which a sounding signal is to be transmitted by the MT. In step M105. The MT receives the LBS_RSP and in step M106, the MT transmits a sounding signal at the indicated time T1. In step B104, the BS receives the sounding signal and records the arrival time T1' and the AOA $\alpha_1$ of the sounding signal. In step B105, via a signaling (i.e., LBS_REQ), the BS requests a straight-line distance d between the two end points of the MT's moving track. In step M107, MT reports the information in an LBS_RSP message transmitted to the BS.

Figure 2:
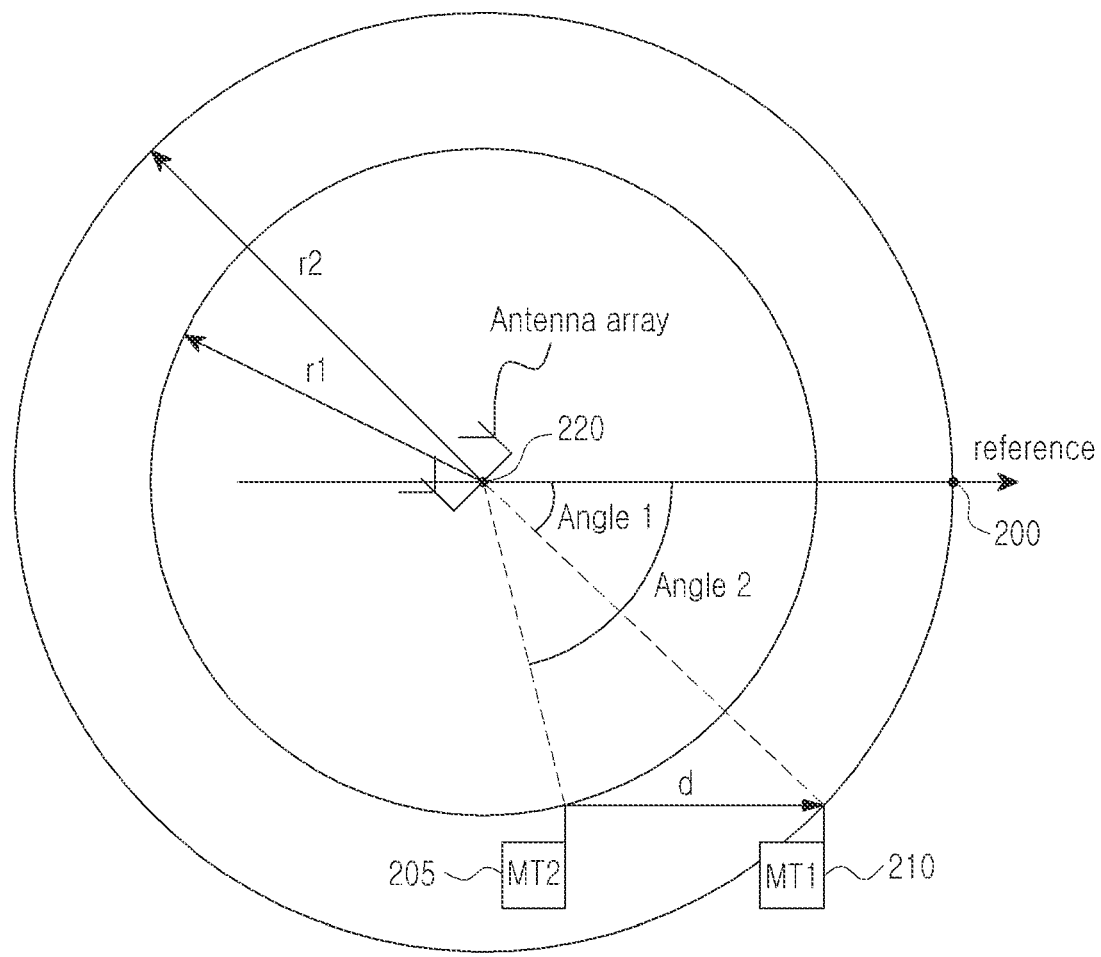
FIG. 2 illustrates a tracking process of an MT's moving track and a Base Station's (BS's) azimuth according to an exemplary embodiment of the present invention.

With these obtained parameters, in step B106, the BS establishes and solves equations, in which the respective locations are associated as shown in FIG. 2.

FIG. 2 illustrates a tracking process of an MT's moving track and a BS's azimuth according to an exemplary embodiment of the present invention.

Referring to FIG. 2, a location of the MT is represented by the following Equation 1.

$$r_2 - r_1 = ((T'_1 - T_1) - (T'_0 - T_0)) * C_{light}$$

$$\alpha_2 - \alpha_1 = \alpha$$

$$r_1^2 + r_2^2 - 2r_2 * r_1 * \cos(\alpha) = d^2 \qquad \text{Equation 1}$$

$C_{light}$ is a velocity of the sounding signal transmitted in step M103 and in the step M106, if a velocity of each of the sounding signals transmitted in step M103 and step M106 is the same. $r_1$ is a distance between the MT in step M103, MT1 210, and the BS 220. $r_2$ is a distance between the MT in step M106, MT2 205 and the BS 220 after moving the MT1 210. $\alpha_1$ is a phase from a predetermined reference 200 phase to the MT1 210. $\alpha_2$ is a phase from the predetermined reference 200 to the MT 205, and d is a distance between the MT 1 210 and the MT 2 205.

Equation 1 can be simplified as the following Equation 2 with a single variable r1.

$$r_1^2 + T_d * C_{light} * r_1 + ((T_d * C_{light})^2 - d^2)/(2(1 - \cos(a))) = 0 \qquad \text{Equation 2}$$

In Equation 2, Td=(T1'−T1)−(T0'−T0). Although the timing clock may vary between the BS and the MT, effects from such difference can be counteracted by the use of the difference value, Td.

A solution of a set of quadratic equations is represented by the following Equation 3:

$$r_1 = \frac{-T_d * C_{light} \pm \sqrt{(T_d * C_{light})^2 - 4 * \frac{((T_d * C_{light})^2 - d^2)}{(2(1-\cos(\alpha)))}}}{2}$$

Equation 3

Generally, only one solution is practical in consideration of information on actual cell radius. The location of the MT can be determined in connection with information on AOA, after r1 is obtained and r2 is inferred.

Assuming that the BS's location is the origin, and the reference direction of the antenna array is the direction of X axis, the location coordinates (x1,y1), (x2,y2) of the two end points can be calculated as the following Equation 4.

$$x_1 = r_1 * \cos(\alpha_1), y_1 = r_1 \sin(a_1), x_2 = r_2 * \cos(a_2), y_2 = r_2 * \cos(a_2)$$

Equation 4

The BS sends the calculation result to the MT. Alternatively, the BS can, based on its own latitude and longitude coordinates, convert the calculation result into actual latitude and longitude coordinates and then sends them to the MT.

Different methods can be adopted to obtain the moving distance d with different situations. In the situation of a walking movement, the distance can be estimated by referring to a reference object on the ground. Alternatively, the subscriber can estimate an approximate distance according to road distance indication, and input the distance data into the MT through a man-machine interface application. For on-vehicle movement, the distance can be obtained by a DR calculation positioning algorithm. The DR calculation algorithm is a commonly used vehicle positioning algorithm. The DR calculation system primarily comprises sensors for measuring flight azimuth and sensors for measuring distance. The sensors for measuring flight azimuth may include a compass, an angular speed gyroscope, and the like. The sensors for measuring distance may include an odometer and an accelerometer. The gyroscope outputs the angular speed of the flight azimuth. The integral of angular speed can be taken as a relative rotating angle of the carrier. The vehicle's moving track can be obtained through a real-time measurement and recording of moving distance and relative rotating angle, and the straight-line distance between the two end points for sounding signaling can be calculated with the moving track.

Figure 3:
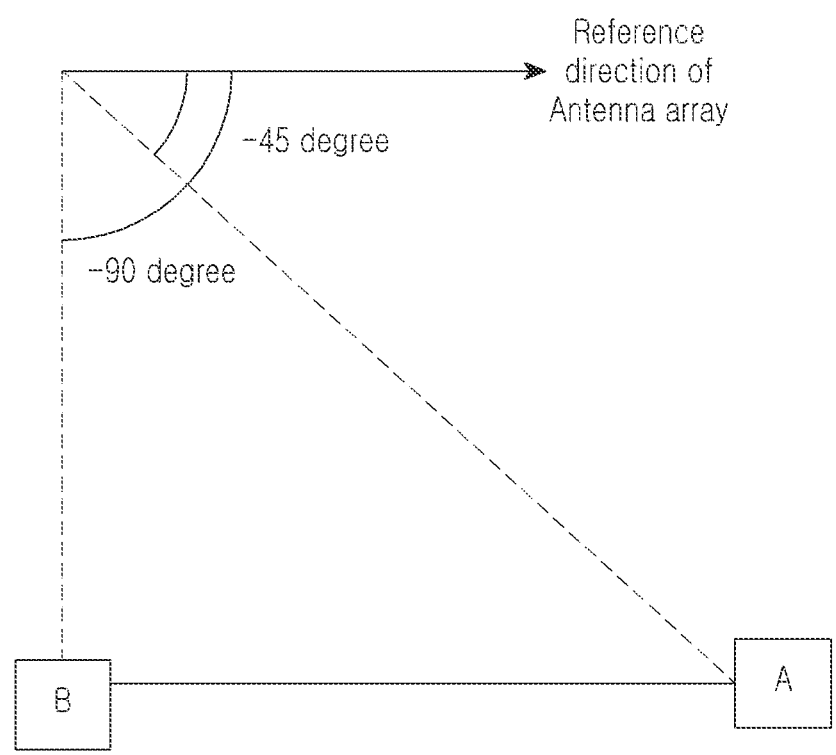
FIG. 3 is a schematic diagram for explaining a positioning technique according to an exemplary embodiment of the present invention.

FIG. 3 is a schematic diagram for explaining a positioning technique according to an exemplary embodiment of the present invention.

Referring to FIG. 3, an MT sends a LBS request to a BS. The BS informs the MT of a time T=TA for transmitting a sounding signal, and then receives the sounding signal from the MT at time TA+1.414 µs. At this moment, the AOA is recorded as −45°. After moving a certain distance (300 m in the example shown in FIG. 3), the MT requests positioning again. The BS informs the MT of a time T=TB for transmitting a sounding signal, and then receives the sounding signal at time TB+1 us from the MT. The AOA is recorded as −90° at this moment. Via signaling, the BS determines that the MT has moved a distance of 300 m. With Td=−0.414 µs and t light velocity of 300 m/µs, the following Equation 5 is obtained as:

$$r_1^2 - 0.414*300*r_1 + ((0.414*300)^2 - 300^2)/2(1-0.707)) = 0$$

Equation 5

The solution of the equation is obtained as r1=424.2 m, with removal of an unreasonable root of r1=−300 m. Further, r2 is inferred as r2=300 m. With information on the angle, the location coordinates corresponding to points A and B can be determined as (300,−300), (0,−300).

Figure 4:
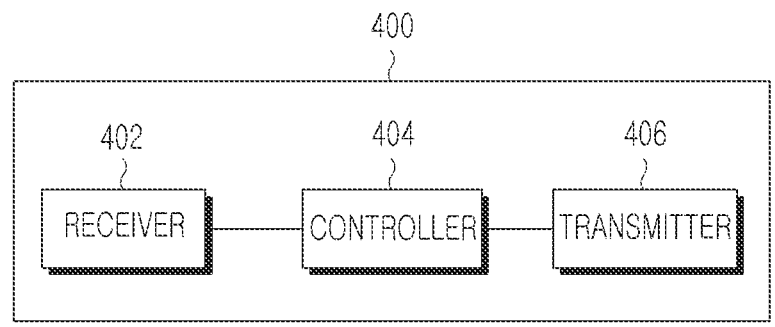
FIG. 4 is a block diagram of an MT according to an exemplary embodiment of the present invention.

FIG. 4 is a block diagram of an MT according to an exemplary embodiment of the present invention.

Referring to FIG. 4, an MT 400 includes a receiver 402, a controller 404, and a transmitter 406. The MT may include additional and/or different units. Similarly, the functionality of two or more of the above units may be integrated into a single component.

The transmitter 406 transmits a first LBS_REQ to the BS requesting to allocate a first transmission time for transmitting a first sounding signal by controlling of the controller 404. The receiver 402 receives the first transmission time from the BS. The transmitter 406 transmits the first sounding signal at the first transmission time to the BS, and transmits a second LBS_REQ to the BS requesting to allocate a second transmission time of a second sounding signal again after the MT moves. The receiver 402 receives the second transmission time from the BS. The transmitter 406 transmits the second sounding signal at the second transmission time to the BS, and reports a moving distance moved during the period between the first transmission time and the second transmission time. The receiver 402 receives a positioning result of the MT determined based on the first sounding signal, the second sounding signal and the moving distance. The positioning result is represented by Equation 1.

Figure 5:
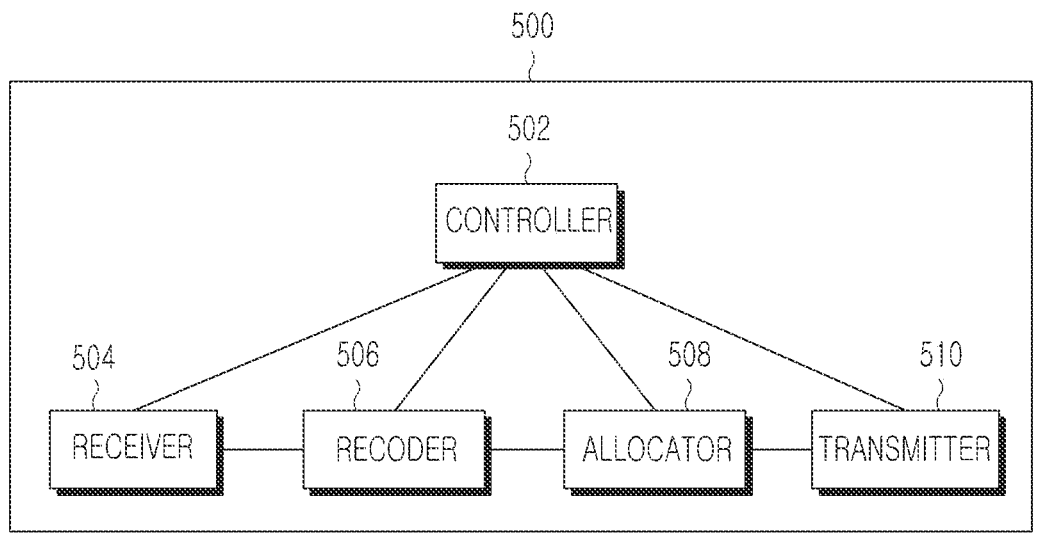
FIG. 5 is a block diagram of a BS according to an exemplary embodiment of the present invention.

FIG. 5 is a block diagram of a BS according to an embodiment of the present invention.

Referring to FIG. 5, a BS 500 includes a controller 502, a receiver 504, a recorder 506, an allocator 508, and a transmitter 510.

The allocator 508 allocates a first transmission time of a first sounding signal by controlling of the controller 502. The transmitter 510 transmits the first transmission time to the MT. The receiver 504 receives the first sounding signal transmitted from the MT at the first transmission time. The recorder 506 records a first arrival time of the first sounding signal and an Angle of Arrival (AOA) of the first sounding signal by controlling of the controller 502.

The allocator 508 allocates a second transmission time of a first sounding signal by controlling of the controller 502. The transmitter 510 transmits the second transmission time to the MT. The receiver 504 receives the second sounding signal transmitted from the MT at the second transmission time. The recorder 506 records a second arrival time of the second sounding signal and an AOA of the second sounding signal by controlling of the controller 502. The receiver 504 receives from the MT a moving distance moved by the MT during the period between the first transmission time and second transmission time. The controller 502 positions the MT by using the first arrival time, the AOA of the first sounding signal, the second arrival time, the AOA of the second sounding signal, and the moving distance. The positioning result is represented by Equation 1. The transmitter 510 transmits a first transmission time of a first sounding signal for the MT to the MT.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method by a Mobile Terminal (MT) for positioning the MT, the method comprising:

requesting a Base Station (BS) to allocate a first transmission time for transmitting a first sounding signal for the MT;

receiving the first transmission time from the BS;

transmitting the first sounding signal to the BS at the first transmission time;
requesting to allocate a second transmission time of a second sounding signal for the MT to the BS again after the MT moves;
receiving the second transmission time from the BS;
transmitting the second sounding signal to the BS at the second transmission time;
reporting a moving distance moved during the period between the first transmission time and the second transmission time; and
receiving a position of the MT determined by using the first sounding signal, the second sounding signal, and the moving distance.

2. The method of claim 1, wherein the positioning result of the MT is represented by a first difference value, a second difference value, and a third difference value,
wherein the first difference value is a difference between a second distance and a first distance, the first distance is a distance between the MT and the BS when the first sounding signal is transmitted, and the second distance is a distance between the MT and the BS when the second sounding signal is transmitted,
wherein the second difference value is a difference between a second phase and a first phase, the first phase is a phase from a predetermined reference to the MT when the first sounding signal is transmitted, and the second phase is a phase from the predetermined reference to the MT when the second sounding signal is transmitted, and
wherein the third difference value is a distance between a position of the MT when the first sounding signal is transmitted and a position of the MT when the second sounding signal is transmitted.

3. The method of claim 2, wherein the first difference value is calculated based on the first transmission time, a first arrival time, the second transmission time, a second arrival time and a velocity of both the first sounding signal and the second sounding signal,
wherein the velocity for each of the first sounding signal and the second sounding signal is the same, and
wherein the first arrival time is a time when the first sounding signal is received by the BS, and the second arrival time is a time when the second sounding signal is received by the BS.

4. The method of claim 2, wherein the third difference value is calculated based on the first distance, the second distance, and the second difference value.

5. A method by a Base Station (BS) for positioning a Mobile Terminal (MT), the method comprising:
transmitting a first transmission time of a first sounding signal for the MT to the MT;
receiving the first sounding signal transmitted from the MT at the first transmission time;
recording a first arrival time of the first sounding signal and an Angle Of Arrival (AOA) of the first sounding signal;
transmitting a second transmission time of a second sounding signal for the MT to the MT;
receiving the second sounding signal transmitted from the MT at the second transmission time;
recording a second arrival time of the second sounding signal and an AOA of the second sounding signal;
receiving from the MT a moving distance moved by the MT during the period between the first transmission time and the second transmission time; and
positioning the MT based on the first arrival time, the AOA of the first sounding signal, the second arrival time, the AOA of the second sounding signal, and the moving distance.

6. The method of claim 5, further comprising transmitting, to the MT, a position of the MT.

7. The method of claim 6, wherein the position is represented by a first difference value, a second difference value, and a third difference value,
wherein the first difference value is a difference between a second distance and a first distance, the first distance is a distance between the MT and the BS when the first sounding signal is transmitted, and a second distance is a distance between the MT and the BS when the second sounding signal is transmitted,
wherein the second difference value is a difference between a second phase and a first phase, the first phase is a phase from a predetermined reference to the MT when the first sounding signal is transmitted, and the second phase is a phase from a predetermined reference to the MT when the second sounding signal is transmitted, and
wherein the third difference value is a distance between a position of the MT when the first sounding signal is transmitted and a position of the MT when the second sounding signal is transmitted.

8. The method of claim 7, wherein the first difference value is calculated based on the first transmission time, the first arrival time, the second transmission time, the second arrival time, and a velocity of both the first sounding signal and the second sounding signal, and
wherein the velocity for each of the first sounding signal and the second sounding signal is the same.

9. The method of claim 7, wherein the third difference value is calculated based on the first distance, the second distance, and the second difference value.

10. The method of claim 5, wherein the transmitting of the first transmission time of the first sounding signal for the MT to the MT comprises receiving a request to allocate the first transmission time from the MT.

11. A Mobile Terminal (MT) for positioning in a communication system, the MT comprising:
a transmitter for transmitting a request to a Base Station (BS) to allocate a first transmission time, for transmitting a first sounding signal for the MT, for transmitting the first sounding signal at the first transmission time to the BS, for transmitting a request to the BS to allocate a second transmission time of a second sounding signal for the MT after the MT moves, for transmitting the second sounding signal at the second transmission time to the BS, and for reporting a moving distance moved during the period between the first transmission time and the second transmission time; and
a receiver for receiving the first transmission time and the second transmission time from the BS, and for receiving a positioning result of the MT determined based on the first sounding signal, the second sounding signal, and the moving distance.

12. The MT of claim 11, wherein the positioning result of the MT is represented by a first difference value, a second difference value, and a third difference value,
wherein the first difference value is a difference between a second distance and a first distance, the first distance is a distance between the MT and the BS when the first sounding signal is transmitted, and the second distance is a distance between the MT and the BS when the second sounding signal is transmitted, wherein the second difference value is a difference between a second phase and a first phase, the first phase is a phase from a predetermined reference to the MT when the first sounding signal is transmitted, and the second phase is a phase from the predetermined reference to the MT when the second sounding signal is transmitted, and wherein the third difference value is a distance between a position of the MT when the first sounding signal is transmitted and a position of the MT when the second sounding signal is transmitted.

13. The MT of claim 11, wherein the first difference value is calculated based on the first transmission time, a first arrival time, the second transmission time, a second arrival time, and a velocity of both the first sounding signal and the second sounding signal, wherein the velocity for each of the first sounding signal and the second sounding signal is the same, and wherein the first arrival time is a time when the first sounding signal is received by the BS, and the second arrival time is a time when the second sounding signal is received by the BS.

14. The MT of claim 13, wherein the third difference value is calculated based on the first distance, the second distance, and the second difference value.

15. A Base Station (BS) for positioning a Mobile Terminal (MT) in a communication system, the BS comprising:

an allocator for allocating a first transmission time of a first sounding signal for the MT and a second transmission time of a second sounding signal for the MT;

a transmitter for transmitting the first transmission time and the second transmission time to the MT;

a receiver for receiving the first sounding signal transmitted from the MT at the first transmission time and the second sounding signal transmitted from the MT at the second transmission time, and for receiving from the MT a moving distance moved by the MT during the period between the first transmission time and the second transmission time;

a recorder for recording a first arrival time of the first sounding signal, an Angle Of Arrival (AOA) of the first sounding signal, a second arrival time of the second sounding signal, and an AOA of the second sounding signal; and a controller for positioning the MT based on the first arrival time, the AOA of the first sounding signal, the second arrival time, the AOA of the second sounding signal, and the moving distance.

16. The BS of claim 15, wherein the transmitter transmits, to the MT, a position of the MT.

17. The BS of claim 16, wherein the position is represented by a first difference value, a second difference value, and a third difference value, wherein the first difference value is a difference between a second distance and a first distance, the first distance is a distance between the MT and the BS when the first sounding signal is transmitted, and a second distance is a distance between the MT and the BS when the second sounding signal is transmitted, wherein the second difference value is a difference between a second phase and a first phase, the first phase is a phase from a predetermined reference to the MT when the first sounding signal is transmitted, the second phase is a phase from the predetermined reference to the MT when the second sounding signal is transmitted, and wherein the third difference value is a distance between a position of the MT when the first sounding signal is transmitted and a position of the MT when the second sounding signal is transmitted.

18. The BS of claim 17, wherein the first difference value is calculated based on the first transmission time, the first arrival time, the second transmission time, the second arrival time, and a velocity for both the first sounding signal and the second sounding signal, and wherein the velocity for each of the first sounding signal and the second sounding signal is the same.

19. The BS of claim 17, wherein the third difference value is calculated based on the first distance, the second distance, and the second difference value.

20. The BS of claim 15, wherein when the receiver receives a request to allocate the first transmission time from the MT, the allocator allocates the first transmission time and the second transmission time.

* * * * *